United States Patent Office 2,824,094
Patented Feb. 18, 1958

2,824,094

CHROMIUM CONTAINING AZO DYESTUFFS

Hans Ackermann, Riehen, near Basel, and Guido Schetty, Basel, Switzerland, assignors to J. R. Geigy A. G., Basel, Switzerland, a Swiss firm No Drawing. Application September 27, 1955
Serial No. 537,055

Claims priority, application Switzerland October 8, 1954

7 Claims. (Cl. 260—146)

The present invention is concerned with new azo dyestuffs which contain heavy metal, the production and use thereof for the fast dyeing of polypeptide fibres such as wool, superpolyamides and superpolyurethanes. In particular, it is concerned with the influencing of the dyeing properties of metal containing unsulphonated azo dyestuffs by incorporating complex formers in the metal containing dyestuff molecule, which formers are different from the metallisable azo dyestuff. Finally, it is also concerned with the production of unsymmetrical, but comparatively stable, heavy metal complexes by the co-ordination of a metallisable azo dyestuff which can occupy more than 3 co-ordination positions at the metal atom, and a complex former which can occupy less than 3 co-ordination positions at the metal atom, with a co-ordinative hexavalent heavy metal atom.

It is known that, in comparison with the metal free azo dyestuff, the altered dyeing behaviour on dyeing wool of the complex chromium compound which contains one metal atom bound to each dyestuff molecule is due to the fixation of the chromium atom on the substratum. (See W. Ender and A. Müller, Melliands Textilberichte 19, 181 (1938).) In metallised dyestuffs of these types there has not been a lack of attempts, therefore, to hinder the disadvantageous results of a too early fixing of the metal on the wool by masking the chromium bound in complex linkage in the complete dyestuff molecule. Thus, in German Patent No. 741,462 the production of new chromium compounds is described which are made up from one molecule of a metallisable dyestuff, for example an unsulphonated o.o'-dihydroxyazo dyestuff, one molecule of an aromatic o-hydroxycarboxylic acid, for example salicylic acid or sulphosalicylic acid, and one chromium atom. They are obtained by displacing a molecule of the aromatic o-hydroxycarboxylic acid in the complex salicylatochromiates of the composition [Sa$_2$Cr(H$_2$O)$_2$]M, (Sa=salicylic acid, M=alkali cation) by the metallisable o.o'-dihydroxyazo dyestuff on heating in aqueous solution or suspension. It has been found, however, that these complex compounds consisting of one molecule of the metallisable dyestuff, one chromium atom and one molecule of an aromatic o-hydroxycarboxylic acid easily make further changes under the reaction conditions of the process sketched above. In particular, the action of the unmetallised starting dyestuff on the already formed chromium complex of the type described above, brings about the formation of complex metal compounds which consist of two molecules of dyestuff and one chromium atom and which have different properties. For this reason, such unsymmetrical chromium containing dyestuffs with a masked chromium atom are obtained by the method described only in unsatisfactory yield and purity. In the production of such unsymmetrical, chromium containing dyestuffs a great advance with regard to yield and purity was attained by eliminating every possibility of the unmetallised dyestuff acting upon the metallised dyestuff on the addition of salicylic acid and derivatives thereof to complex chromium compounds of unsulphonated monoazo dyestuffs which contain a complete metal atom bound to each dyestuff molecule. However, it is difficult, if not impossible, to obtain such metallised chromium complexes of unsulphonated monoazo dyestuffs of a ratio of 1 mol dyestuff to 1 mol chromium in a pure form in an aqueous medium. The process in steps in non-aqueous solvents is a great technical disadvantage.

It has been found that comparatively stable, unsymmetrical complex heavy metal compounds of metallisable azo dyestuffs which consist of a dyestuff molecule, a metal atom and a complex former different from this dyestuff molecule, can be obtained in aqueous or organic solution or suspension by a reaction which produces practically no side products, if such metallisable azo dyestuffs which are capable of forming tricyclic chelates are treated in the presence of co-ordinative divalent complex formers with agents giving off co-ordinative hexavalent heavy metal.

A modification of the process consists in reacting metal complexes consisting of one molecule of an azo dyestuff capable of forming tricyclic chelate and one atom of a co-ordinative hexavalent heavy metal, with co-ordinative divalent complex formers.

The characteristic of the process according to the present invention is the use of azo dyestuffs which are capable of forming tricyclic chelates whilst in the processes already known azo dyestuffs are used exclusively to form dicyclic chelates, for example, o.o'-dihydroxyazo, o-carboxy-o'-hydroxyazo or o-hydroxy-o'-aminoazo dyestuffs. Dyestuffs used according to the present invention are capable of occupying 4 co-ordination positions at the complex forming heavy metal atom whilst forming three 5 or 6 membered chelate rings whereas the dyestuffs used up to the present occupy 3 co-ordination positions while forming only 2 chelate rings. These tricyclic chelates cause the valences of the metal forming the complex to be saturated to a greater degree and have a far less tendency to form further complexes than the dicyclic chelates. They can be very easily obtained therefore in aqueous solution or suspension, also in the presence of unmetallised starting dyestuff and in spite of this are capable of adding co-ordinative divalent complex formers so that according to the choice of the components, they can be given the desired dyeing properties. The capability for the supplementary addition of co-ordinative divalent complex formers is sufficiently great so that the desired unsymmetrical metal complexes can be produced simply by metallising the dyestuffs in aqueous medium in the presence of such complex formers and the masked metal complexes according to the present invention are sufficiently stable to hinder the disadvantages of too early fixation of the metal on the wool. Thus, in contrast to earlier processes, it is neither necessary to use previously prepared complex metallising agents made up from excess complex former and heavy metal salts for the metallising of the dyestuffs, nor, in addition, is it necessary to prepare in a first step under special conditions the metallised dyestuff having a ratio of 1 dyestuff molecule to 1 metal atom and to react this in a second step with a colourless complex former although it is also possible, and often very easy even in an aqueous medium, to produce first the so-called 1:1 complex and then in the same medium to add the co-ordinative divalent complex former. The new process according to the present invention is, therefore, technically very advantageous.

The azo dyestuffs usable according to the process of the present invention which are cabale of occupying 4 co-ordination positions, can have atoms for example in the following order:

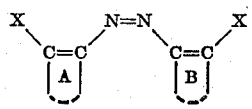

wherein the free valences generally are bound to aromatic iso- or heterocyclic rings A and B, one X represents an hydroxyl group, and the other X represents the radical $$-(SO_2)_n-NH-D$$

in which D is a carboxymethyl, a carboxyethyl, an o-hydroxyphenyl, an o-carboxyphenyl or an 8-quinolinyl radical, and $n$ is one of the integers 0 and 1, the radical of aminoacetic acid —NH—CH$_2$—COOH, the radical of $\beta$-aminopropionic acid —NH—CH$_2$—CH$_2$—COOH, the o-carboxyphenylamino radical, the o-hydroxyphenylamino radical, the quinolinyl-(8)-amine radical, the sulphonic acid glycinide radical, the sulphonic acid amide-$\beta$-propionic acid radical, the sulphonic acid-o-carboxyphenylamide radical, the sulphonic acid-o-hydroxyphenylamide radical, etc. The radical X can be either in the diazo or also in the coupling component. Diazo components for the production of the dyestuffs usable according to the present invention are, for example, 2-aminobenzene-1-sulphonic acid amides which contain an acetic acid, propionic acid, o-hydroxy- or o-carboxy-phenyl radical as substituents at the nitrogen atom of the amide group and wherein the aromatic rings can be further substituted as desired. The diazo compounds thereof are coupled, for example, with acylacetic acid arylamides, 5-pyrazolones, phenols and naphthols coupling in the o-position to the hydroxyl group, to form the azo dyestuffs usable according to the present invention. Azo dyestuffs usable according to the present invention are also obtained by coupling diazotised 2-amino-1-hydroxy compounds and 2-amino-1-carboxylic acids of the aromatic series with azo components coupling in the neighbouring position to the substituted amino group, the substituent of the amino group being, for example, the acetic acid radical, the propionic acid radical, an o-carboxy, or o-hydroxyphenyl radical. Examples of such coupling components are 2-naphthyl-$\beta$-amino-propionic acid, 2-(o-carboxyphenylamino)-naphthalene, 2-(o-hydroxyphenylamino)-naphthalene, in which compounds too the aromatic rings can be further substituted. Suitable azo dyes therefor correspond to the formula:

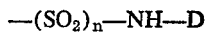

wherein A represents a radical of the benzene series containing the hydroxyl group in o-position to the azo group, B represents a radical of the naphthalene series bound to the azo group in 1-position and containing the $$-NH-D-COOH$$

radical in 2-position, D represents a methylene, ethylene or o-phenylene radical. If necessary, also o-alkoxy amino compounds can be used as diazo components and the alkoxy group in the completed dyestuff molecule modified into the hydroxyl group, e. g. during the metallisation process.

Examples of divalent complex formers in the process according to the present invention are aliphatic $\alpha$-hydroxycarboxylic acids, $\alpha$-aminocarboxylic acids, aromatic o-hydroxycarboxylic acids, vicinal dihydroxyaryl compounds, o-amino-hydroxyaryl compounds, 8-hydroxyquinolines or benzoquinolines, aromatic o-hydroxyaldehydes, aromatic o-hydroxy ketones, o-hydroxyazo and o-hydroxybenzene azo methine compounds, 1.2-diaminoalkanes, pyridine and benzopyridine-2-carboxylic acids and o-nitrosonaphthols. These can be more closely adapted to the desired purpose by further substitution, preferably in aromatic rings, by halogen, sulphonic acid, sulphonic acid amide groups.

By the suitable choice of a co-ordinative divalent complex former, it is possible to favourably improve, for example, the drawing power on to wool, the levelling power and the non-selective dyeing of different qualities of wool of a certain tricyclic metallised azo dyestuff.

In the process according to the present invention, chiefly chromium and possibly also cobalt can be used as complex forming co-ordinative hexavalent heavy metal. The usual salts of these metals can be used as metal-yielding agents; often in the chroming of unsulphonated azo dyestuffs in aqueous solution or suspension, the complex chromocsalicylates can be used with advantage. The new process is particularly valuable in the production of unsulphonated tricyclic metallised dyestuffs. By this process often particularly pure complex chromium compounds which draw well on to wool from a neutral to weakly acid bath can be produced.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

*Example 1*

29.2 parts of 2-aminobenzene-1-sulphonic acid-(2'-carboxyphenylamide) are dissolved with 8 parts of sodium hydroxide in 120 parts of hot water and 6.9 parts of sodium nitrite are added. The cooled solution is slowly added dropwise at 0–5° to a mixture of 46 parts of concentrated hydrochloric acid and 100 parts of water. The reaction mixture is then neutralised with sodium bicarbonate and poured at 0–3° into a solution of 22 parts of 1-(3'-chlorophenyl)-3-methyl-5-pyrazolone and 4 parts of sodium hydroxide in 400 parts of water. On completion of the dyestuff formation, the dyestuff is precipitated by the addition of sodium chloride, filtered off and dried. The dyestuff is then heated in 250 parts of formamide with chromic acetate (corresponding to 5.2 parts of chromium) and 15 parts of 8-hydroxyquinoline for 2½ hours at 135° and the yellow solution formed is poured into a mixture of 150 parts of concentrated hydrochloric acid and 2000 parts of water. The chromium containing dyestuff precipitates. It is filtered off, washed with water, stirred in 250 parts by volume of 0.5 N-caustic soda lye for 15 minutes at 80–90°, precipitated by the addition of sodium chloride, filtered off and dried. It is a yellow brown powder and it dyes wool from an acetic acid bath in greenish-yellow shades. The dyeings are very level and are distinguished by good fastness properties.

*Example 2*

23.2 parts of 5 - nitro - 2 - amino - 1 - hydroxybenzene-4-methyl sulphone are pasted in 150 parts of glacial acetic acid and 18 parts of concentrated hydrochloric acid and 6.9 parts of sodium nitrite as concentrated aqueous solution are added at 20–25°. 27.6 parts of 2-(2'-carboxyphenyl)-naphthylamine are added and the whole is heated to 50–60°. On completion of the dyestuff formation, the dyestuff which precipitates in crystalline form is filtered off, washed with acetic acid and then with hot water and dried. It is then dissolved in 200 parts of formamide with 13.3 parts of 30% caustic soda lye, and heated for 1½ hours at 125–130° with chromic acetate (corresponding to 5.2 parts of chromium) and 16 parts of 8-hydroxyquinoline. The reaction mixture is poured into 2000 parts of an 80° warm 15% sodium chloride solution, neutralised with caustic soda lye and the dyestuff which has precipitated is filtered off. It is a complex chromium compound containing one atom of chromium in complex union with one molecule of the dyestuff of the formula

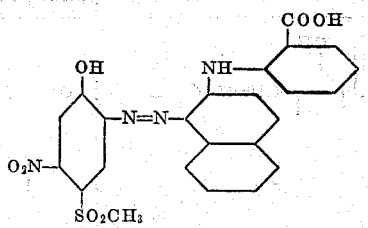

and with one molecule of 8-hydroxyquinoline, and is a green powder which dyes wool from a weakly acid bath in pure yellowish green shades. The dyeings have very good fastness properties.

Example 3

The metal free dyestuff obtained according to Example 2 is dissolved in 750 parts of water with 4 parts of sodium hydroxide. Cobalt acetate (corresponding to 5.9 parts of cobalt) is added at 70°, sodium carbonate is added until the reaction is phenolphthalein alkaline and the whole is stirred at 70–80° until all the starting dyestuff has disappeared. 17.4 parts of 8-hydroxyquinoline are added and the whole is stirred for 2 hours at 70–80°. The dyestuff which has completely precipitated, is filtered off and dried. It is a complex cobalt compound containing one atom of cobalt in complex union with one molecule of the dyestuff of the formula

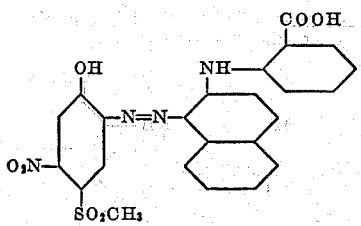

and with one molecule of 8-hydroxyquinoline, and is a dark green powder which dyes wool from a weakly acid bath in green shades which have very good fastness properties.

Example 4

The metal free dyestuff obtained according to Example 2 is dissolved in 200 parts of formamide with 13.3 parts of 30% caustic soda lye and heated with chromic acetate (corresponding to 5.2 parts of chromium) for 1½ hours at 120–125°. The mixture is poured into 1000 parts of saturated sodium chloride solution, the precipitated dyestuff is filtered off and dried. It is then stirred in 500 parts of alcohol. 28 parts of sodium acetate and a solution of 12.3 parts of salicylaldehyde and 9.3 parts of aniline in 100 parts of alcohol are added and the whole is boiled under reflux for 3 hours. The reaction mixture is poured on to 2000 parts of 15% sodium chloride solution, the dyestuff is filtered off and dried. It is a green powder which dyes wool from a weakly acid bath in pure green shades which have very good fastness properties.

Example 5

18.9 parts of 5 - nitro - 4 - chloro - 2 - amino - 1 - hydroxybenzene are diazotised as described in Example 2 and coupled with 27.6 parts of 2-(2'-carboxyphenyl)-naphthylamine. The dried dyestuff in 450 parts of ethylene glycol monomethyl ether is boiled under reflux with chromic acetate (corresponding to 5.2 parts of chromium in 300 parts of water) until the starting dyestuff has disappeared. 52 parts of sodium acetate and 14.8 parts of picolinic acid are added and the whole is again boiled for 2 hours under reflux. The reaction mixture is diluted with water and the precipitated dyestuff is filtered off. After drying, it is a green powder which dyes wool from an acetic acid bath in very fast green shades.

Example 6

32.8 parts of 3 - amino - 4 - hydroxy - 3' - sulphamido-diphenyl sulphone are diazotised according to Example 2 and coupled with 27.6 parts of 2-(2'-carboxyphenyl)-naphthylamine. The dried dyestuff is heated for 1 hour at 120–130° in 250 parts of acetamide with chromic acetate (corresponding to 5.2 parts of chromium). The mixture is poured on to 1000 parts of 15% sodium chloride solution the dyestuff is filtered off and pasted in 750 parts of water. Sodium carbonate is added until the reaction is phenolphthalein alkaline, 19.8 parts of 5-chloro-8-hydroxyquinoline are added and the whole is heated for 1 hour at 80–90°. The dyestuff is completely precipitated by the addition of sodium chloride and filtered off. It is a green powder which dyes wool from a neutral to weakly acid bath in pure green shades which have very good fastness properties.

Example 7

18.7 parts of 2-amino-1-hydroxybenzene-4-methyl sulphone are diazotised as described in Example 2 and coupled with 27.6 parts of 2-(2'-carboxyphenyl)-naphthylamine. The dyestuff, after being well washed, is dissolved in 600 parts of water with 8 parts of sodium hydroxide and is boiled under reflux with 225 parts of a solution of ammonium chromosalicylate (corresponding to 5.2 parts of chromium) until the metallisation is complete. The dyestuff is precipitated by the addition of sodium chloride and filtered off. It is a green powder which dyes wool from an acid bath in fast bluish-green shades. This chromium containing dyestuff contains coordinated salicylic acid.

The following dyestuffs are obtained in the manner described in the above examples:

| No. | Diazo component | Azo component | Complex former | Metal | Colour on wool |
|---|---|---|---|---|---|
| 1 | 5-nitro-2-amino-1-hydroxybenzene | 2-(2'-carboxyphenyl)-naphthylamine | 8-hydroxyquinoline | Cr | Yellowish green. |
| 2 | 5-nitro-4-chloro-2-amino-1-hydroxybenzene | ...do... | ...do... | Co | Green. |
| 3 | 4-nitro-2-amino-1-hydroxybenzene | ...do... | ...do... | Cr | Yellowish green. |
| 4 | 2 - amino - 1 - hydroxybenzene - 4 - ethyl sulphone. | ...do... | ...do... | Cr | Do. |
| 5 | 5-nitro-2-aminobenzoic acid | ...do... | ...do... | Cr | Bluish green. |
| 6 | 5 - nitro - 2 - amino - 1 - hydroxybenzene - 4 - ethyl sulphone. | ...do... | ...do... | Cr | Yellowish green. |
| 7 | 5 - nitro - 2 - amino - 1 - hydroxybenzene - 4 - methyl sulphone. | 2 - (5' - chloro - 2' - carboxyphenyl) - naphthylamine. | ...do... | Cr | Do. |
| 8 | ...do... | 2-(β-carboxyethyl)-naphthylamine | ...do... | Cr | Bluish green. |
| 9 | ...do... | 2-(2'-carboxyphenyl)-naphthylamine | Salicylaldehyde | Cr | Green. |
| 10 | ...do... | ...do... | o-Hydroxyacetophenone | Cr | Do. |
| 11 | 5 - nitro - 4 - chloro - 2 - amino - 1 - hydroxybenzene. | ...do... | OH-C6H4-CH=N-CH3 | Cr | Yellowish green. |

| No. | Diazo component | Azo component | Complex former | Metal | Colour on wool |
|---|---|---|---|---|---|
| 12 | 5 - nitro - 2 - amino - 1 - hydroxybenzene - 4-methylsulphone. | ....do.... | 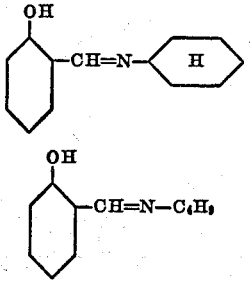 | Cr | Green. |
| 13 | ....do.... | 2 - (5' - chloro - 2' - carboxyphenyl) - naphthylamine. | 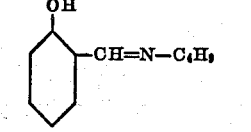 | Cr | Do. |
| 14 | ....do.... | 2-(2'-carboxyphenyl)-naphthylamine.. | Quinaldic acid.. | Cr | Yellowish green. |
| 15 | ....do.... | ....do.... | 5 - hydroxy - azo - (4) - phenanthrene. | Cr | Do. |
| 16 | 4.6-dinitro-2-amino-1-hydroxybenzene.. | ....do.... | Salicylic acid.. | Cr | Green. |
| 17 | 2 - aminobenzene - 1 - sulphonic acid - (2' - carboxyphenylamide). | 2-naphthol.. | ....do.... | Cr | Red-brown. |
| 18 | 3 - amino - 4 - hydroxy - 3' - sulphamido - diphenyl sulphone. | 2-(2'-carboxyphenyl)-naphthylamine.. | 8-hydroxyquinoline.. | Cr | Green. |
| 19 | 5 - nitro - 2 - amino - 1 - hydroxybenzene - 4-methyl sulphone. | ....do.... | Picolinic acid.. | Cr | Do. |
| 20 | 2-aminobenzoic acid.. | ....do.... | 8-hydroxyquinoline.. | Cr | Bluish green. |
| 21 | 5-nitro-2-amino-1-hydroxybenzene.. | 2-(β-carboxyethyl)-naphthylamine.. | ....do.... | Cr | Green. |
| 22 | 2-aminobenzene-1-sulphonic acid glycinide. | 1-phenyl-3-methyl-5-pyrazolone.. | Salicylic acid.. | Cr | Greenish yellow. |
| 23 | ....do.... | 7-methoxy-2-naphthol.. | ....do.... | Cr | Red-brown. |
| 24 | 2 - aminobenzene - 1 - sulphonic acid - (2' - hydroxyphenylamide). | 2-naphthol.. | 8-hydroxyquinoline.. | Cr | Do. |
| 25 | ....do.... | 1-phenyl-3-methyl-5-pyrazolone.. | Salicylic acid.. | Cr | Reddish-yellow. |

Referring to representative ones of the products of the preceding table:

Product No. 4 is a complex chromium compound containing one atom of chromium in complex union with one molecule of the dyestuff of the formula

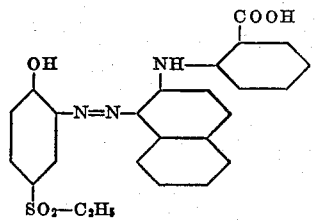

and with one molecule of 8-hydroxyquinoline;

Product No. 6 is a complex chromium compound containing one atom in complex union with one molecule of the dyestuff of the formula

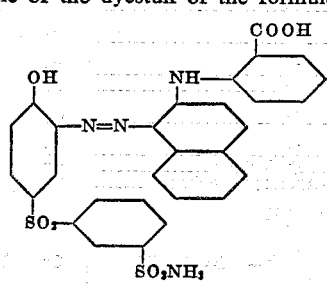

and with one molecule of 8-hydroxyquinoline;

Product No. 18 is a complex chromium compound containing one atom of chromium in complex union with one molecule of the dyestuff of the formula and with one molecule of 8-hydroxyquinoline; and Product No. 19 is a complex chromium compound containing one atom of chromium in complex union with one molecule of the dyestuff of the formula

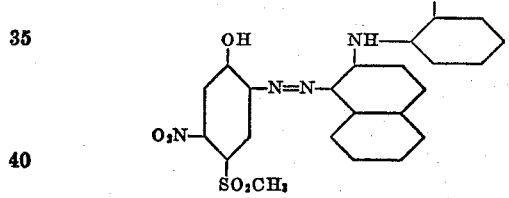

and with one molecule of picolinic acid.

What we claim is:

1. A chromiferous compound which contains one atom of chromium in complex union with one molecule of an unsulphonated monoazo dyestuff capable of forming tricyclic chelates and which corresponds to the formula:

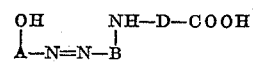

wherein A represents a radical of the benzene series containing the hydroxyl group in o-position to the azo group, B represents a radical of the naphthalene series bound to the azo group in 1-position and containing the

—NH—D—COOH radical in 2-position, D represents an o-phenylene radical, and with one molecule of a coordinative divalent complex former containing a metallizable structure selected from the group consisting of structures of the formulae:

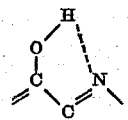

and

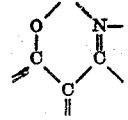

and

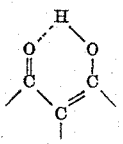

and of the tautomeric forms thereof.

2. A chromiferous compound which contains one atom of chromium in complex union with one molecule of an unsulphonated monoazo dyestuff capable of forming tricyclic chelates and which corresponds to the formula:

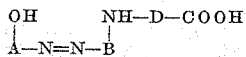

wherein A represents a radical of the benzene series containing the hydroxyl group in o-position to the azo group, B represents a radical of the naphthalene series bound to the azo group in 1-position and containing the

radical in 2-position, D represents an o-phenylene radical, and with one molecule of 8-hydroxyquinoline.

3. The complex chromium compound which contains one atom of chromium bound in complex union to one molecule of the dyestuff of the formula:

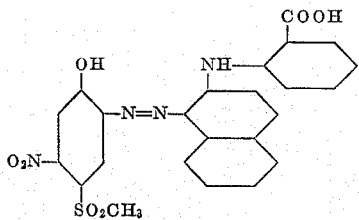

and to one molecule of 8-hydroxyquinoline.

4. The complex chromium compound which contains one atom of chromium bound in complex union to one molecule of the dyestuff of the formula:

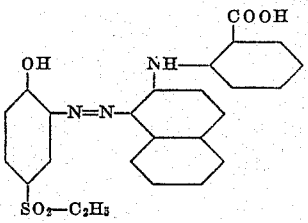

and to one molecule of 8-hydroxyquinoline.

5. The complex chromium compound which contains one atom of chromium bound in complex union to one molecule of the dyestuff of the formula:

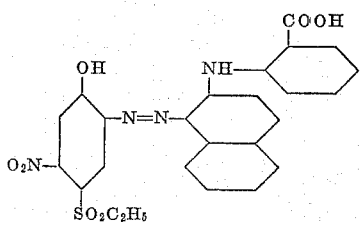

and to one molecule of 8-hydroxyquinoline.

6. The complex chromium compound which contains one atom of chromium bound in complex union to one molecule of the dyestuff of the formula:

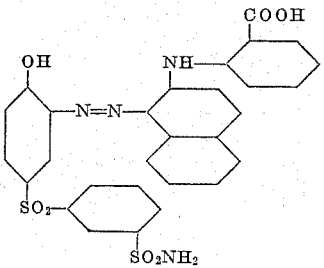

and to one molecule of 8-hydroxyquinoline.

7. The complex chromium compound which contains one atom of chromium bound in complex union to one molecule of the dyestuff of the formula:

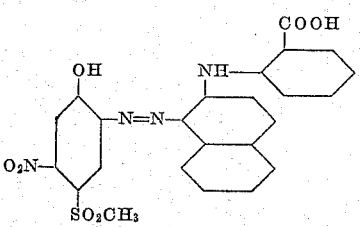

and to one molecule of picolinic acid.

References Cited in the file of this patent
UNITED STATES PATENTS

| | | |
|---|---|---|
| 1,994,116 | Straub et al. | Mar. 12, 1935 |
| 2,551,056 | Schetty | May 1, 1951 |